United States Patent
Loessel et al.

(10) Patent No.: US 10,689,490 B2
(45) Date of Patent: Jun. 23, 2020

(54) METHOD FOR PRODUCING SIOH-FUNCTIONAL POLYSILOXANES

(71) Applicant: Wacker Chemie AG, Munich (DE)

(72) Inventors: Georg Loessel, Emmerting (DE); Frank Betschinger, Altoetting (DE); Manfred Meisenberger, Hochburg (AT)

(73) Assignee: WACKER CHEMIE AG, Munich (DE)

( * ) Notice: Subject to any disclaimer, the term of this patent is extended or adjusted under 35 U.S.C. 154(b) by 49 days.

(21) Appl. No.: 16/074,656

(22) PCT Filed: Nov. 2, 2016

(86) PCT No.: PCT/EP2016/076403
§ 371 (c)(1),
(2) Date: Aug. 1, 2018

(87) PCT Pub. No.: WO2018/082766
PCT Pub. Date: May 11, 2018

(65) Prior Publication Data
US 2019/0040206 A1    Feb. 7, 2019

(51) Int. Cl.
*C08G 77/06* (2006.01)
*C08G 77/16* (2006.01)

(52) U.S. Cl.
CPC .............. *C08G 77/16* (2013.01); *C08G 77/06* (2013.01)

(58) Field of Classification Search
None
See application file for complete search history.

(56) References Cited

U.S. PATENT DOCUMENTS

| | | | | |
|---|---|---|---|---|
| 3,011,987 A | * | 12/1961 | Walton | C08G 77/24 524/860 |
| 3,018,270 A | * | 1/1962 | Toogood | C08G 77/16 528/43 |
| 3,120,500 A | * | 2/1964 | Huntington | C08G 77/16 528/14 |
| 6,069,220 A | | 5/2000 | Hoffmann | |
| 8,076,438 B2 | * | 12/2011 | Ackermann | C08G 77/04 528/10 |
| 2016/0145396 A1 | | 5/2016 | Loessel | |
| 2017/0349709 A1 | * | 12/2017 | Sandmeyer | C08G 77/18 |
| 2018/0265640 A1 | * | 9/2018 | Sandmeyer | C08G 77/18 |

FOREIGN PATENT DOCUMENTS

| | | |
|---|---|---|
| DE | 19800023 A1 | 7/1999 |
| DE | 102013212980 A1 | 1/2015 |

* cited by examiner

*Primary Examiner* — Robert S Loewe
(74) *Attorney, Agent, or Firm* — Brooks Kushman P.C.

(57) ABSTRACT

Organopolysiloxanes having an OH content of 3.0-10.0% by weight are produced in a continuous process in which silanes of the formula I $$R^1_m SiR^2_n X_o \qquad (I),$$

in which
$R^1$ is a $C_1$-$C_{18}$-hydrocarbon radical and
$R^2$ is a $C_1$-$C_6$-alkoxy radical and
X is a chlorine or bromine radical
m is 1, 2 or 3,
n is 0, 1, 2 or 3 and
o is 0, 1, 2 or 3,
with the proviso that 4−m=n+o, and that in at least 30 mol % of the silanes of the general formula I, n≠0 und o≠0, water, and water-insoluble non-polar solvent are metered in continuously into a reactor to form a reaction mixture and the reaction mixture is continuously discharged from the reactor.

10 Claims, No Drawings

METHOD FOR PRODUCING SIOH-FUNCTIONAL POLYSILOXANES

CROSS REFERENCE TO RELATED APPLICATIONS

This application is the U.S. National Phase of PCT Appln. No. PCT/EP2016/076403 filed Nov. 2, 2016, the disclosure of which is incorporated in their entirety by reference herein.

BACKGROUND OF THE INVENTION

1. Field of the Invention

The invention relates to a continuous process for producing SiOH-functional polysiloxanes with low molecular weight.

2. Description of the Related Art

DE 102013212980 describes SiOH-functional polyphenylsiloxanes that can be produced by a continuous process in which, inter alia, chlorosilanes in a proportion by weight of 95% to 60% and alkoxysilanes in a proportion by weight of 5% to 40%, based on the sum total of chlorosilanes and alkoxysilanes, are metered into the reaction apparatus in parallel with water and a non-polar solvent.

The years of technical experience handling these polysiloxane resins show that high molecular weights, Mw>3000 g/mol, are unsuitable for surface-sensitive coating applications. Here, preference is given to processing products having molecular weights of <3000 g/mol.

However, in the process of DE 102013212980, particularly in the case of producing polyphenylsiloxanes comprising polymethylsiloxanes, problems arise with undesirable high molecular weights Mw>3000 g/mol.

SUMMARY OF THE INVENTION

The invention provides a continuous process for producing organopolysiloxanes having an OH content of 3.0-10.0% by weight,
in which silanes of the general formula I

  (I), in which
$R^1$ is a $C_1$-$C_{18}$-hydrocarbon radical and
$R^2$ is a $C_1$-$C_6$-alkoxy radical and
X is a chlorine or bromine radical
m denotes the values 1, 2 or 3,
n denotes the values 0, 1, 2 or 3 and
o denotes the values 0, 1, 2 or 3,
with the proviso that 4−m=n+o, and that in at least 30 mol % of the silanes of the general formula I, n≠0 and o≠0,
that water and non-polar solvent, soluble to an extent of not more than 1 g in 1 l of water at 20° C. and 1 bar, are metered in continuously to the reaction mixture and the reaction mixture is continuously discharged.

DETAILED DESCRIPTION OF THE PREFERRED EMBODIMENTS

By using silanes of the general formula I having both $C_1$-$C_6$-alkoxy radicals and chlorine and/or bromine radicals, the continuous reaction proceeds smoothly and organopolysiloxanes are obtained having more uniform and relatively low molecular weights, especially molecular weights Mw<3000 g/mol.

The organopolysiloxanes having an OH content of 3.0-10.0% by weight are produced in the process in a simple and cost-effective manner. A hydrolysis-condensation reaction takes place.

In contrast to the known processes, the organopolysiloxanes having an OH content of 3.0-10.0% by weight are produced with very short residence times by the process according to the invention, even omitting water-soluble polar solvents including alcohols. By virtue of the short residence times and relatively low amounts of alkoxysilanes, the formation of chloroalkanes from alcohol and HCl is suppressed and the amount of alcohol is reduced.

This also results in critical cost advantages compared to known continuous and discontinuous processes, since, in addition to the higher throughput due to low residence times, the complexity of the waste water treatment can be significantly reduced at the same time by virtue of low burdens of COD and PDX. The waste waters also have relatively high flash points of over 55° C.

The $C_1$-$C_{18}$-hydrocarbon radicals $R^1$ are preferably $C_1$-$C_6$-alkyl radicals, especially methyl, ethyl or propyl radicals or phenyl radicals.

Preferably 10 to 90 mol %, more preferably 20 to 80 mol %, and especially 30 to 70 mol % of the $C_1$-$C_{18}$-hydrocarbon radicals $R^1$ are phenyl radicals.

The $C_1$-$C_6$-alkoxy radicals $R^2$ are preferably methoxy or ethoxy radicals.

Preferably in at least 80 mol %, especially at least 95 mol % of the silanes of the general formula I, m has a value of 1 or 2.

Preferably in at least 50 mol %, more preferably at least 70 mol %, and especially at least 90 mol % of the silanes of the general formula I, m is 1.

Preferably this signifies that in at least 50 mol %, more preferably in at least 60 mol %, and especially in at least 70 mol % of the silanes of the general formula I, n≠0 and o≠0.

By way of preference, the silanes of the general formula I, water and the non-polar solvent are metered in continuously to the reaction mixture in a loop reactor and the reaction mixture is discharged continuously from the loop reactor.

A water phase and a solvent phase is formed; these are intimately mixed. Preference is given to metering in water in amounts such that an HCl concentration in the water phase of 5-35% by weight is established.

The non-polar solvent is preferably soluble to an extent of not more than 0.5 g in 1 l of water at 20° C. and 1 bar. Examples of non-polar solvents are hydrocarbons such as pentane, n-hexane, mixtures of hexane isomers, heptane, octane, benzine, petroleum ether, benzene, toluene, xylenes. Particular preference is given to toluene and xylenes.

Polar solvents, which are not metered in, are in particular alcohols such as methanol and ethanol: ethers such as dioxane, tetrahydrofuran, diethyl ether, diisopropyl ether, diethylene glycol dimethyl ether; ketones such as acetone, methyl ethyl ketone, diisopropyl ketone, methyl isobutyl ketone (MIBK); esters such as ethyl acetate, butyl acetate, propyl propionate, ethyl butyrate, ethyl isobutyrate; carbon disulfide and nitrobenzene, or mixtures of these solvents.

The non-polar solvent is preferably supplied to the reaction mixture in amounts such that solids contents of 25-45% by weight are established. The solids content is the amount of organopolysiloxanes formed which are dissolved in the solvent phase.

The organopolysiloxane dissolved in the solvent phase is preferably separated continuously from the water phase. The organopolysiloxane is preferably freed from the solvent by distillation.

Silanes of the general formula I, water and the non-polar solvent are preferably metered into the reaction mixture and reaction mixture continuously discharged so that very short residence times of 1 minute to 30 minutes, preferably 2 minutes to 15 minutes, are established.

The reaction temperature is preferably 20° C. to 100° C., more preferably 40° C. to 80° C., and especially 50° C. to 70° C.

The reaction pressure is preferably 0.05 MPa to 1 MPa, more preferably 0.08 MPa to 0.2 MPa.

Preferably, the organopolysiloxanes having an OH content of 3.0-10.0% by weight have the general formula II

$$R_p SiO_{4-p} \quad (II),$$

in which
R is OH, a $C_1$-$C_{18}$-hydrocarbon radical or a $C_1$-$C_6$-alkoxy radical and
p denotes the values 0, 1, 2 or 3 and
p has average values of 1.0 to 2.0.

The OH content of the organopolysiloxanes refers to the OH groups bonded directly to silicon atoms. Said content is preferably 3.0-8.0% by weight.

p preferably has average values of 1.4 to 1.8.

The organopolysiloxanes having an OH content of 3.0-10.0% by weight preferably have an average molecular weight Mw of 1500 to 3500, more preferably 1800 to 3000, and especially 2000 to 2900. The organopolysiloxanes preferably have a Tg (glass transition temperature) of 30° C. to 80° C., especially 35° C. to 75° C.

Preferred definitions of R correspond to the preferred definitions of $R^1$.

In a preferred embodiment, the silanes of the general formula I are produced by reacting halosilanes of the general formula III

$$R^1{}_q SiX_{4-q} \quad (III),$$

and alkoxysilanes of the general formula IV

$$R^1{}_r SiR^2{}_{4-r} \quad (IV),$$

with each other, where
$R^1$ are $C_1$-$C_{18}$-hydrocarbon radicals,
$R^2$ is a $C_1$-$C_6$-alkoxy radical,
X is a chlorine or bromine radical, and
q, r denote the values 1, 2 or 3.

This results in a ligand exchange between X and $R^2$. Preferred definitions of $R^1$, $R^2$, and X are listed under general formula I.

The halosilanes of the general formula III and alkoxysilanes of the general formula IV are preferably brought together in a suitable container.

The reaction between the halosilanes of the general formula III and the alkoxysilanes of the general formula IV is preferably conducted at 0° C. to 100° C., more preferably at 10° C. to 60° C., and especially at 20° C. to 40° C.

The reaction time is preferably 5 min to 5 h, more preferably 10 min to 3 h, and especially 20 min to 1.5 h.

The reaction pressure is preferably 0.05 MPa to 1 MPa, more preferably 0.08 MPa to 0.2 MPa.

Preference is given to metering in the halosilanes of the general formula III in a proportion by weight of 80% to 50% and the alkoxysilanes of the general formula IV in a proportion by weight of 20% to 50%, based on the sum total of halosilanes and alkoxysilanes.

All aforementioned symbols of the formulae above are each defined independently of one another. In all formulae the silicon atom is tetravalent.

Measurement Methods for Relevant Product Parameters
Molecular Compositions:

The molecular compositions are determined by nuclear magnetic resonance spectroscopy (for terminology, see ASTM E 386: High resolution nuclear magnetic resonance spectroscopy (NMR): Concepts and symbols), where the $^1$H nucleus and the $^{29}$Si nucleus is measured.

Description of 1H-NMR Measurement
Solvent: $CDCl_3$, 99.8% by weight D
Sample concentration: ca. 50 mg/1 ml $CDCl_3$ in 5 mm NMR tubes
Measurement without TMS addition, spectrum reference of residual $CHCl_3$ in $CDCl_3$ at 7.24 ppm
Spectrometer: Bruker Avance I 500 or Bruker Avance HD 500 Probe head: 5 mm BBO probe head or SMART probe head (Bruker)
Measurement Parameters:
Pulse program=zg30
TD=64 k
NS=64 or 128 (depending on the sensitivity of the probe head)
SW=20.6 ppm
AQ=3.17 s
D1=5 s
SFO1=500.13 MHz
O1=6.175 ppm
Processing Parameters:
SI=32 k
WDW=EM
LB=0.3 Hz
Depending on the spectrometer type used, individual adjustments to the measurement parameters may be required.

Description of $^{29}$Si-NMR Measurement
Solvent: $C_6D_6$ 99.8% by weight D/$CCl_4$ 1:1 v/v with 1% by weight $Cr(acac)_3$ as relaxation reagent
Sample concentration: ca. 2 g/1.5 ml of solvent in 10 mm NMR tubes
Spectrometer: Bruker Avance 300
Probe head: 10 mm 1H/13C/15N/29Si glass-free QNP probe head (Bruker)
Measurement Parameters:
Pulse program=zgig60
TD=64 k
NS=1024 (depending on the sensitivity of the probe head)
SW=200 ppm
AQ=2.75 s
D1=4 s
SFO1=300.13 MHz
O1=−50 ppm
Processing Parameters:
SI=64 k
WDW=EM
LB=0.3 Hz
Depending on the spectrometer type, individual adjustments to the measurement parameters may be required.

Molecular Weight Distributions:
Molecular weight distributions are determined as weight average Mw and as number average Mn, wherein the method of gel permeation chromatography (GPC or size exclusion chromatography (SEC)) is used using polystyrene standard and refractive index detector (RI detector). Unless stated otherwise, THF is used as eluent and DIN 55672-1 is applied. The polydispersity PD is the quotient Mw/Mn.

The OH content of the organopolysiloxanes is determined in accordance with Zerewitinoff.

In the following examples, unless stated otherwise in each case, all amounts and percentages are based on weight, all pressures 0.10 MPa (abs.) and all temperatures 20° C.

EXAMPLES

Examples 1-2 are produced in analogy to DE102013212980 and Examples 6-9 by the process according to the invention in a 300 liter loop (steel/enamel) with continuous downstream phase separation. The crude product thus obtained is freed from solvent by distillation.

Description of Production of Non-Inventive Examples 1 and 2 in Analogy to DE 102013212980

22 kg/h of dimethyldichlorosilane, 335.2 kg/h of phenyltrichlorosilane and 204.8 kg/h of methyltriethoxysilane are fed into a loop together with 1400 kg/h of water and 900 kg/h of toluene in parallel through a mixing section. The following process parameters are set:

Residence time in minutes: 5-10
Reaction temperature ° C.: 60-65
HCl concentration in water phase: 10-15% by weight
Solids content (=resin dissolved in toluene): 25-30% by weight The molecular weights are reported in Table 1:

TABLE 1

| Example | Mw | Mn | PD | Chlorosilane wt % | Alkoxysilane wt % |
|---|---|---|---|---|---|
| 1 | 8100 | 2000 | 4.07 | 64 | 36 |
| 2 | 7700 | 2000 | 3.86 | 63 | 37 |

Description of Production of Examples 3-6 by the Process According to the Invention 22 kg/h of dimethyldichlorosilane, 335.2 kg/h of phenyltrichlorosilane and 204.8 kg/h of methyltriethoxysilane are combined in a container located upstream of the loop and the residence time is adjusted to 0.25-1.0 h by the appropriate metering rates of the silane mixture being supplied to the loop.

The silane mixture thus pre-conditioned is fed into a loop together with 1400 kg/h of water and 900 kg/h of toluene in parallel through a mixing section. The following process parameters are set:

Residence time in minutes: 5-10
Reaction temperature ° C.: 60-65
HCl concentration in the water phase: 10-15% by weight
Solids content (=resin dissolved in toluene): 25-30% by weight The molecular weights are reported in Table 2:

TABLE 2

| Example | Mw | Mn | PD | Chlorosilane wt % | Alkoxysilane wt % | Residence time h of silane mixture |
|---|---|---|---|---|---|---|
| 4 | 2500 | 1300 | 1.9 | 64 | 36 | 0.6 |
| 5 | 2400 | 1100 | 2.2 | 64 | 36 | 0.66 |
| 6 | 2400 | 1200 | 2.0 | 64 | 36 | 0.66 |
| 7 | 2800 | 1300 | 2.1 | 64 | 36 | 0.6 |

The invention claimed is:

1. A continuous process for producing organopolysiloxanes having an OH content of 3.0-10.0% by weight, comprising:
continuously metering into a reactor, silanes of the formula I $$R^1_m SiR^2_n X_o \qquad (I),$$

in which
$R^1$ each independently is a $C_1$-$C_{18}$-hydrocarbon radical,
$R^2$ each independently is a $C_1$-$C_6$-alkoxy radical,
X is a chlorine or bromine radical,
m is 1, 2 or 3,
n is 0, 1, 2 or 3, and
o is 0, 1, 2 or 3,
with the proviso that 4−m=n+o, and that in at least 30 mol % of the silanes of the formula I, n and o are simultaneously other than 0,
and continuously metering water, and non-polar solvent soluble to an extent of not more than 1 g in 1 L of water at 20° C. and 1 bar, into the reactor to form a reaction mixture, and continuously discharging the reaction mixture from the reactor.

2. The process of claim 1, wherein the silanes of the formula I, water and the non-polar solvent are metered in continuously to the reaction mixture in a loop reactor and the reaction mixture is discharged continuously from the loop reactor.

3. The process of claim 2, wherein the $C_1$-$C_{18}$-hydrocarbon radicals $R^1$ are selected from the group consisting of methyl radicals, ethyl radicals, propyl radicals, phenyl radicals, and mixtures thereof.

4. The process of claim 1, wherein the $C_1$-$C_{18}$-hydrocarbon radicals $R^1$ are selected from the group consisting of methyl radicals, ethyl radicals, propyl radicals, phenyl radicals, and mixtures thereof.

5. The process of claim 1, wherein 10 to 90 mol % of the $C_1$-$C_{18}$-hydrocarbon radicals $R^1$ are phenyl radicals.

6. The process of claim 1, wherein the $C_1$-$C_6$-alkoxy radicals $R^1$ are methoxy and/or ethoxy radicals.

7. The process of claim 1, wherein at least 80 mol % of the silanes of the formula I have the values 1 or 2 for m.

8. The process of claim 1, wherein water is metered in in amounts such that a HCl concentration in the water phase of 5-35% by weight is established.

9. The process of claim 1, wherein the non-polar solvent comprises a hydrocarbon solvent.

10. The process of claim 1, wherein the silanes of the formula I are produced by reacting halosilanes of the formula III $$R^1_q SiX_{4-q} \qquad (III),$$

and alkoxysilanes of the formula IV $$R^1_r SiR^2_{4-r} \qquad (IV),$$

with each other, where
$R^1$ each individually is a $C_1$-$C_{18}$-hydrocarbon radicals,
$R^2$ each individually is a $C_1$-$C_6$-alkoxy radical,
X is a chlorine or bromine radical and
q, r are 1, 2 or 3.

* * * * *